March 3, 1964 R. H. KRESS 3,123,171
VEHICLE
Original Filed Nov. 28, 1958 4 Sheets-Sheet 1

INVENTOR:
RALPH H. KRESS
BY John F. Schmidt

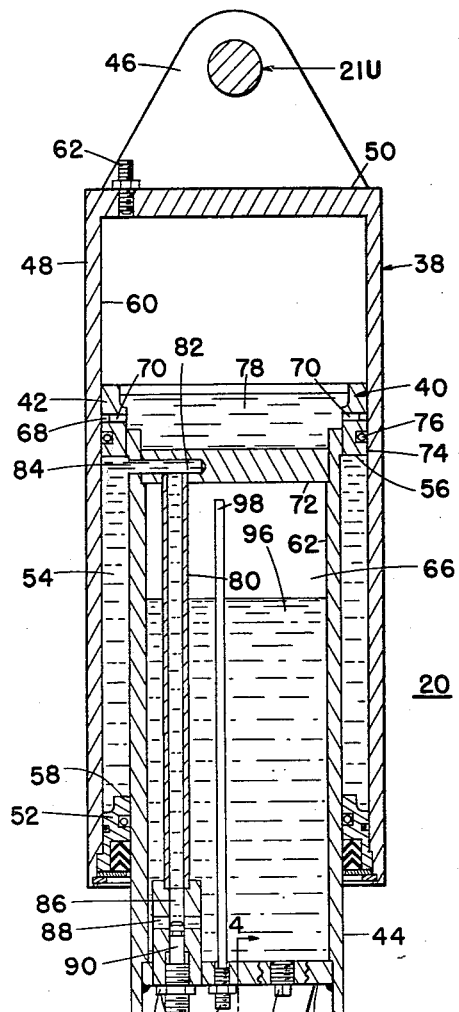
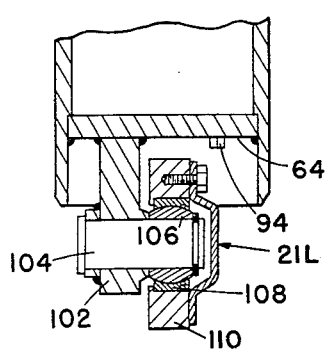

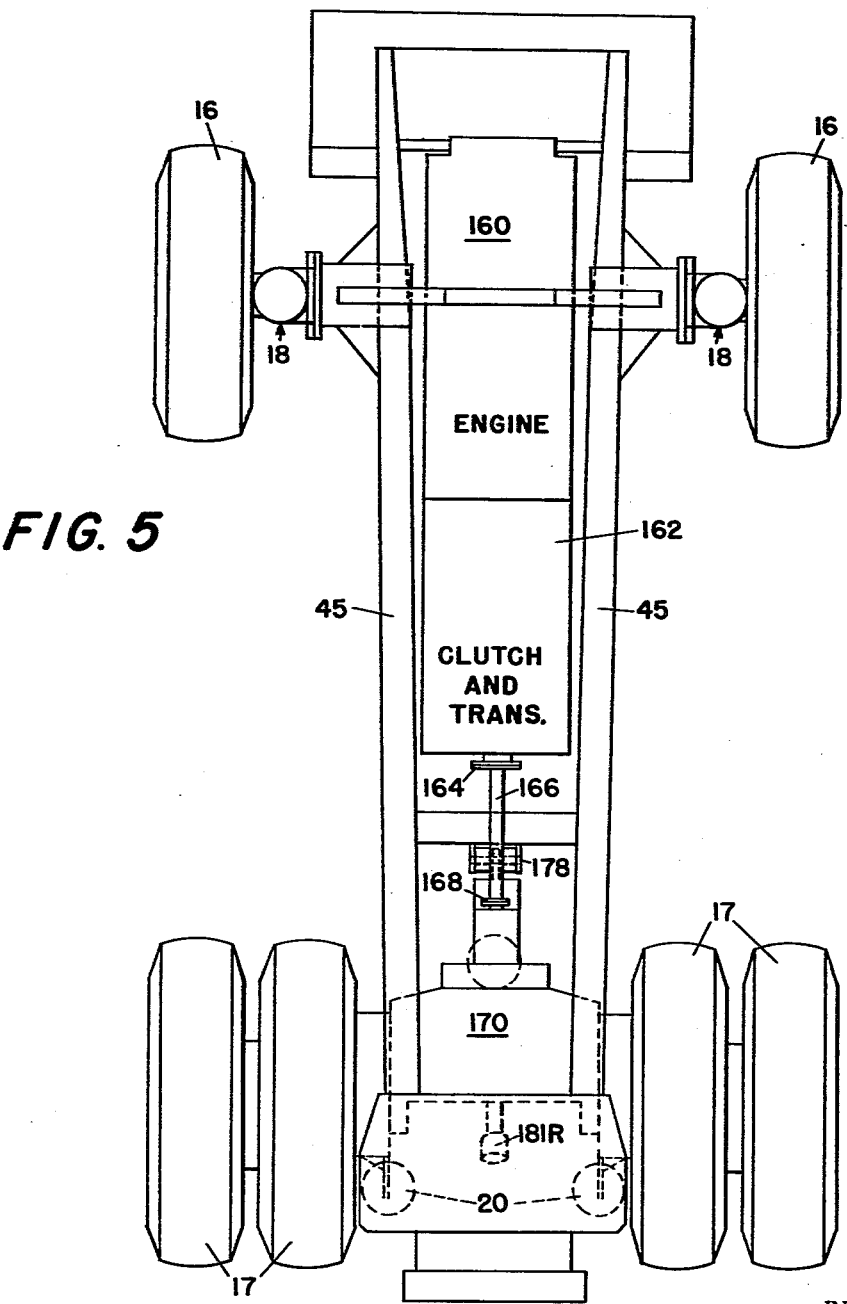

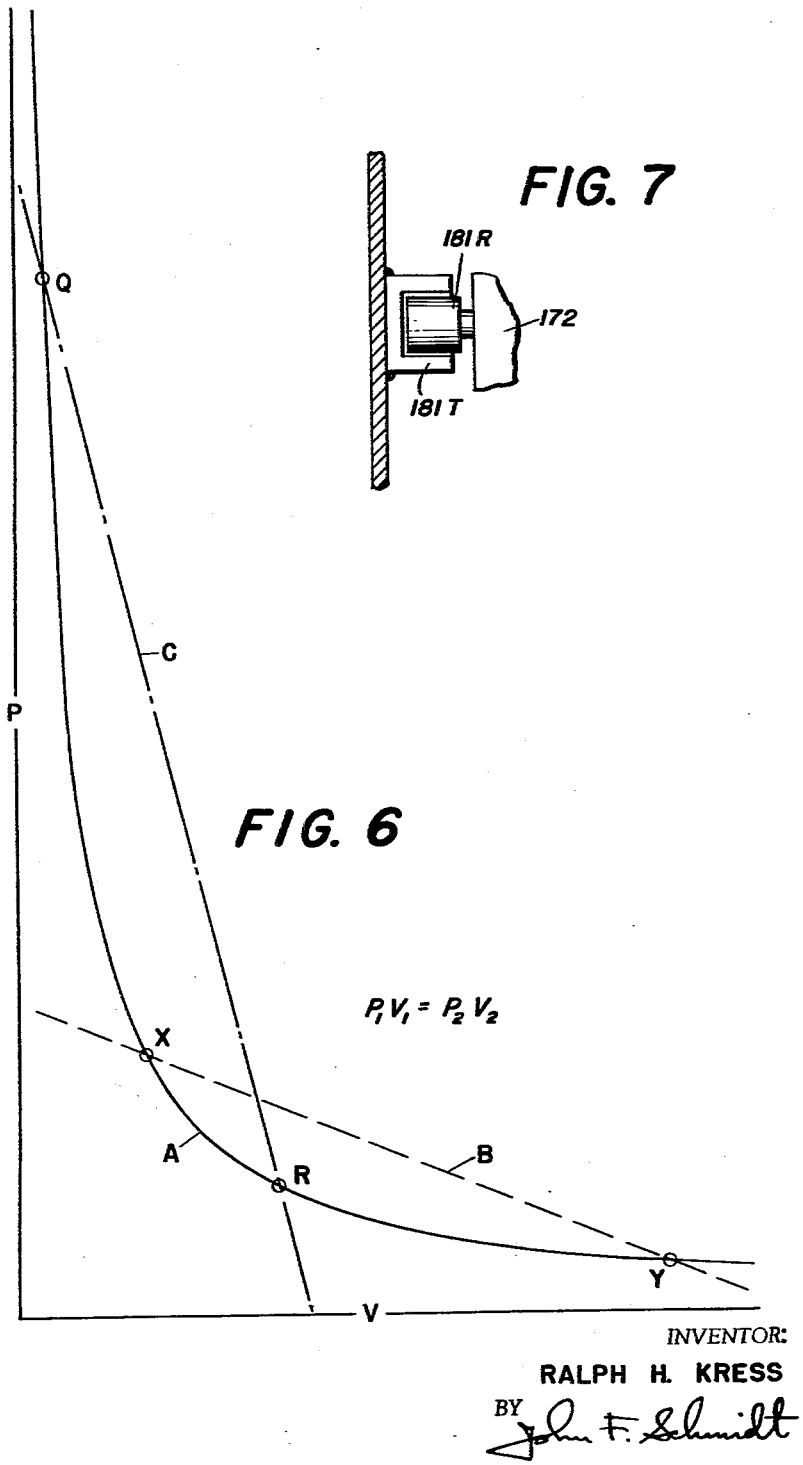

3,123,171
VEHICLE

Ralph H. Kress, Peoria, Ill., assignor to Kress Automotive Engineering, Peoria, Ill., a partnership
Original application Nov. 28, 1958, Ser. No. 777,070, now Patent No. 3,014,739, dated Dec. 26, 1961. Divided and this application Apr. 12, 1961, Ser. No. 102,535
1 Claim. (Cl. 180—73)

This invention relates to vehicles generally, and particularly, the invention relates to off-highway automotive vehicles. This application is a division of application Serial No. 777,070, filed November 28, 1958, now Patent No. 3,014,739, issued December 26, 1961.

Although the advantages of the various aspects of this invention are capable of application to vehicles generally, they are probably realized to their fullest extent in automotive vehicles of the off-highway type. Off-highway vehicles are required to negotiate difficult terrain and are necessarily subject to greater shocks due to unevenness of the terrain encountered by the vehicle. The shocks referred to result in tremendous shock loading of the wheel suspension means of such vehicles.

In view of the foregoing, it is one object of this invention to provide wheel drive and suspension means for vehicles which will materially reduce unsprung weight and shock loading of the structural elements involved. This and other objects are accomplished in a combination of wheel drive and suspension devices and mounting means for these devices, in which the devices are of the piston-and-cylinder expansible chamber type. Other objects will be apparent to those skilled in the art from a consideration of the following description and the appended drawings.

In the drawings:

FIG. 3 is a longitudinal sectional view through one of the expansible chamber suspension devices, also on a much larger scale than FIG. 1.

FIG. 4 is a view in section substantially on line 4—4 of FIG. 3.

FIG. 5 is a top plan view, partially schematic, showing the tractor chassis, the wheel suspension devices thereof, and the final drive housing and its relationship to the wheel suspension devices.

FIG. 6 is a pressure-volume graph showing the difference in principle between suspension devices of the type here disclosed and more conventional types; and FIG. 7 is a view on line 7—7 of FIG. 2, but on a larger scale than FIG. 2.

Figure 1:
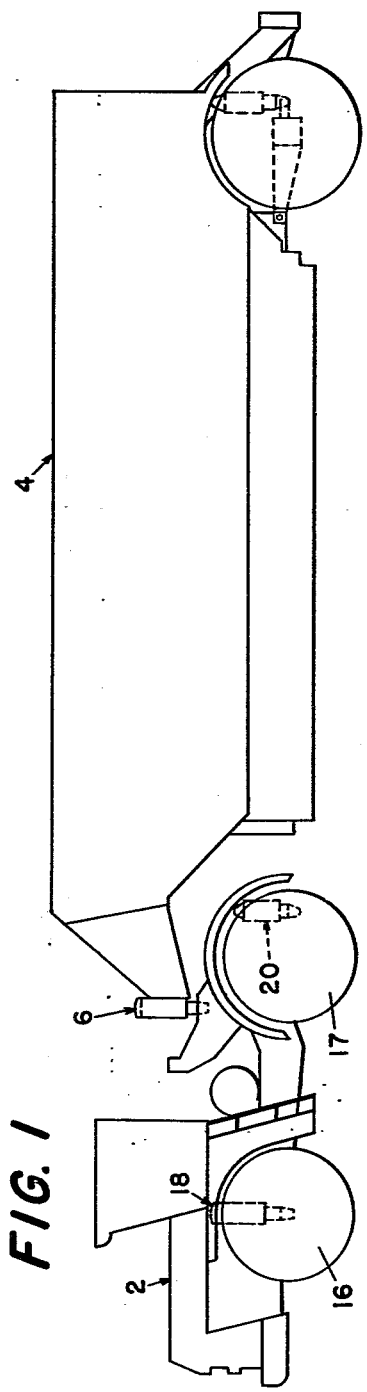
FIG. 1 is a schematic, largely outline, drawing of a two-vehicle train showing the location of the wheel suspension means and the coupling means by which one vehicle is partially supported on the other.

Referring now in detail to the figures, FIG. 1 shows a train consisting of a tractor indicated generally at 2 and a trailer 4. The tractor supports the front end of the trailer by means of a coupling indicated generally at 6 and described in detail in my above-identified Patent 3,014,739. The tractor or lead vehicle 2 is provided with wheels 16 and 17; the forward wheels 16 are the dirigible wheels in the embodiment shown, and the wheels 17 are the drive wheels.

The wheels are carried on the vehicle by means of wheel suspensions indicated generally at 18 and 20. As is explained in detail in my Patent 2,914,337, November 24, 1959, each wheel suspension is an expansible chamber device having a cylinder assembly and a piston assembly, one assembly being connected with the vehicle frame and the other to a wheel, the connections for device 20 being shown in FIGS. 2–4 as 21U and 21L respectively. Thus, in the embodiment shown here, a cylinder assembly 38 and a piston assembly 40 make up the expansible chamber device 20 (FIG. 3), piston assembly 40 including a piston 42 and a piston rod 44. One of the two assemblies of the expansible chamber device is secured to a frame member 45, and the wheel drive housing is secured to the other assembly. Thus, in the embodiment shown in FIG. 3, the cylinder assembly 38 is secured to frame member 45 by means of a suitable mounting bracket 46, and the wheel drive housing is secured to the piston assembly 40.

Referring now in greater detail to FIG. 3, it can be seen that cylinder assembly 38 consists of a cylinder 48 having an integral closed end 50 and an open opposite end which is adapted to be sealed by a closure 52. Closure 52 is a suitably packed ring and is fixed in the lower end of cylinder 38 and has sliding engagement with piston rod 44. The piston assembly and the cylinder assembly together define an annular space 54, this being the space between the lower face 55 of piston 42 and the upper surface 58 of closure 52, and the bore 60 and piston rod 44. The closed end 50 of cylinder 48 is provided with a charging valve 62 which may be any one of a number of commercially available check valves permitting fluid to flow under pressure in one direction only and being releasable to permit fluid flow in the opposite direction.

The space above piston 42 is charged with a dry compressible fluid at a substantial pressure. By "substantial" is meant several atmospheres. Precisely what the pressure needs to be is a design detail to be worked out by those skilled in the art. It suffices to note here that the pressure must be enough to support the load, plus enough to offset the pressure in the opposing chamber below the piston.

In a preferred embodiment of the invention, piston assembly 40 is hollow. In the embodiment shown in FIG. 3, this hollow consists of a bore 62 in the piston rod 44. Bore 62 is closed at its upper end by piston 42, and at its lower end by a closure 64 which is here shown as welded to the surface forming bore 62. The bore 62, closed at its ends as aforesaid, thus provides a reservoir 66. Piston 42 is preferably provided with a peripheral groove 68 and with a plurality of circumferentially spaced holes 70 connecting groove 68 with a cup-shaped reservoir in the upper surface of piston 42. Piston 42 is here seen as comprising a central plate portion 72 welded in the upper end of bore 62 (the bore at its upper end being slightly larger to provide a locating shoulder for plate 72), the upper end of piston rod 44, and a ring 74 welded to the outside of piston rod 44. An O-ring 76 is provided in a groove in the external surface of ring 74.

The aforementioned cup-shaped reservoir is filled with oil as shown at 78, which fills the groove 68 and lubricates the surface of engagement on which piston 42 slides relative to bore 60.

Conduit means are provided to connect annular space 54 with the reservoir 66. In the embodiment shown, suitable piping 80 passes through an opening in plate 72, this opening intersecting a passage 82 in the plate which communicates with annular space 54 through a passage 84 in that portion of piston rod 44 which forms part of piston 42. Piping 80 is secured at its lower end in the closure 64 and communicates with an axial bore 86 which in turn is intersected by a transverse bore 88. Any suitable needle valve 90 may be provided in the lower end of bore 86 which is suitably threaded for the purpose. A lock nut 92 is preferably provided to hold the needle valve 90 in place.

Closure 64 is provided with still another bore which is fitted with a plug 94 to permit charging the reservoir with an incompressible fluid shown at 96. Inasmuch as the preferred embodiment of the invention is intended to employ a combination of a compressible fluid and an incompressible fluid, closure member 64 is fitted with a conduit 98 which is long enough to extend at all times above the level of incompressible fluid in the reservoir 66. At its lower end, conduit 98 is fitted with a suitable gas charging valve 100, similar in principle to the valve 62, discussed above.

As aforesaid, piston assembly 40 is secured to the wheel drive housing, and toward this end, a mounting bracket 102 is secured to closure 64. Bracket 102 is suitably apertured to receive a pin 104; pin 104 carries a ball element 106 which cooperates with a socket element 108, carried by a mounting ear 110 on the wheel drive housing (FIG. 2), to provide a universal connection of the piston asesmbly with the wheel drive housing. It will be understood by those skilled in the art that similar means may be used to connect cylinder assembly 38, by means of bracket 46, to frame member 45.

Figure 2:
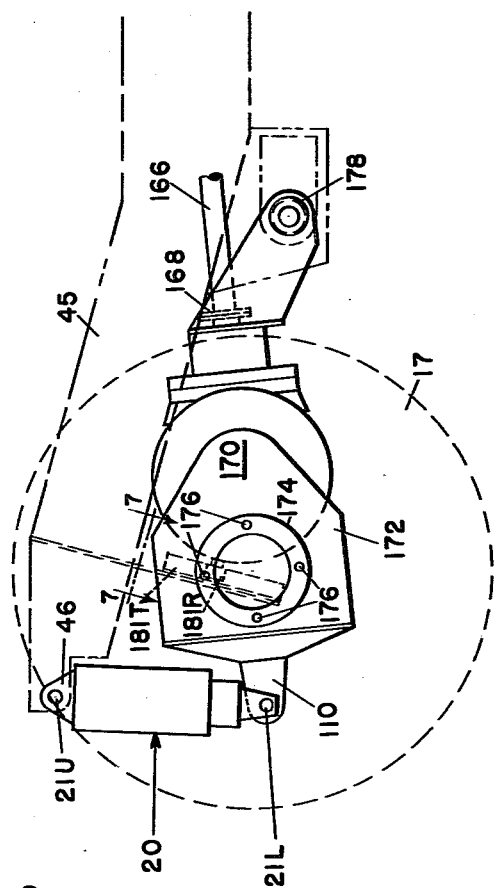
FIG. 2 is a side elevation view of the tractor final drive housing and expansible chamber devices, showing the relationship of this combination of elements to other structural members of the tractor, on a larger scale than FIG. 1.

Reference will now be made to FIGS. 2 and 5 for a discussion in detail of the final drive assembly and its relationship to the rest of the structure. In FIG. 2 the frame member 45 and drive wheel 17 are shown in phantom in order not to obscure certain details of the invention.

In FIG. 5, any suitable engine or power plant 160 is shown schematically. Any suitable clutch and transmission assembly 162 may be provided behind the engine. The transmission is shown as having an output power connection 164. A drive shaft 166 is connected with the output power connection 164 and an input power connection 168 of a final drive assembly indicated generally at 170.

The details of the power train included in the final drive assembly are not disclosed here because those details are not claimed. It will suffice to say that the power train of the final drive assembly may be any suitable train of gears, including some satisfactory differential. The power train is enclosed in a final drive housing 172 which serves as a basic supporting structure for the final drive. As aforesaid, power input connection 168 is shown and may be considered a part of the final drive assembly. Similarly, power output connections for the final drive assembly are provided, and one of these is shown in FIG. 2 at 174; there is of course another such power output connection on the opposite side of the final drive assembly. The drive wheels may be secured to the power output connection 174 in any suitable manner, as for example by being bolted thereto through a suitable number of openings provided for that purpose, four of which are shown at 176 in FIG. 2. It will be understood by those skilled in the art that suitable brakes may be provided. Such items are standard and will therefore not be shown here.

The final drive housing is secured to the vehicle frame by a suitable universal (ball and socket) type of mounting, here indicated generally at 178. The final drive housing is thus secured to the vehicle frame at a point closely adjacent to the power input connection 168. As is best seen in FIG. 2, drive shaft 166 is above the universal connection 178, which means of course that the pivot axis of the final drive assembly is not coincident with the axis of shaft 166 and connection 168. This presents no difficulty because connections 164 and 168 are preferably of the universal joint type and are able to accommodate such misalignment of the axes of connections 164 and 168 as will occur due to the offset relationship of mounting connection 178.

At its rear end, final drive housing 172 is provided with rearwardly extending ears, one of which is shown at 110 in FIG. 2 and is the ear 110 referred to above. The two piston-and-cylinder expansible chamber suspension means 20 for the rear wheels are secured between the ears 110 of final drive housing 172 and suitable mounting brackets at the ends of frame 45. In order to maintain suitable alignment in a vertical plane as the housing 172 swings up and down about the universal mounting 178, some suitable guide means are provided. For example a roller 181R is provided at the rear of final drive housing 172, the roller to operate in a suitable track 181T.

*Operation*

Reference will be made first to FIG. 3 for a discussion in detail of the operation of the oleopneumatic device there shown. The pressure chamber defined by bore 60, upper end 50, and the upper face of piston 42 is charged to the desired pressure with a compressible, preferably dry, fluid, as foresaid. A preferred fluid is nitrogen, although of course air can also be used. The pool of oil 78 provided in the top of piston 42 serves the purpose of lubrication as aforesaid. The annular space 54 is charged with an incompressible fluid, such as oil, and a pool of oil 96 is provided in the reservoir 66. The annular space 54 is kept in communication with the pool of oil 78 by means of the conduit 80. Oil can be added to or taken from the reservoir by removing plug 94. The space above the pool of oil in the reservoir is preferably charged with the same kind of compressible fluid as is used above the piston. The pressure of this compressible fluid can be controlled through the charging valve 100 and conduit 98.

As either set of dual wheels 17 strikes a "bump" in its path, the connected side of housing 172 moves upward in relation to the frame of the tractor. The shock of the sudden upward movement is absorbed by compression of the compressible fluid in the pressure chamber above the piston.

In the meantime, it must be remembered that there is a second pressure chamber opposed to the pressure chamber above the piston, this being the pressure chamber formed by the annular space 54. As piston 42 moves upward, the volume of annular space 54 increases. Cavitation of the incompressible fluid in this space is substantially prevented by the flow of fluid from the reservoir 66 through passages 84 and 82, and conduit 80, into the annular space 54. However, even if oil cannot flow through these passages quickly enough to prevent cavitation entirely, there is no appreciable interference by such cavitation with the upward movement of piston 42. It will of course be recalled that the space above the pool of oil 96 in reservoir 66 is also charged with fluid under a substantial pressure. Accordingly, the oil in the pool 96 tends to "follow" the upward movement of piston 42 quite closely.

As the wheel rides off the "bump," the pressure in the chamber above the piston attempts to restore the piston to its original position. However, as piston 42 begins to move downward in relation to cylinder 48, it encounters the substantially incompressible fluid in the annular space 54; piston 42 cannot move downward in cylinder 48 without displacing oil from the space 54 into the reservoir 66 by way of conduit 80 and passages 82 and 84. In moving through passages 82 and 84, the oil must flow through the variable restriction provided by needle valve 90. Thus the fact that oil must be displaced from the annular chamber or space 54, and the fact that resistance to such movement is offered both by the needle valve and the pressure of the gas above the pool 96—both of these conditions serve to retard the flow of oil to some extent and give a shock absorber action to the suspension. The rate of flow of oil through the conduit 80 can of course be varied by varying the position of needle valve 90.

The action of the suspension when a wheel encounters a hole in its path is of course similar to the action described above when the wheel rides off a bump. In this connection, however, it should be remembered that the pressure of the compressible fluid in reservoir 66 is desirably such as to prevent a complete displacement of incompressible fluid or oil from the annular chamber 54; in this way, the suspension avoids metal-to-metal contact between the surfaces 56 and 58 in the lower limits of the stroke of the piston.

For a discussion of another advantage of this invention over more conventional types of suspension systems, reference will be had to FIG. 6. The curve there shown, marked A, is a graphical representation of the equation $P_1V_1=P_2V_2$, and is of course half of a hyperbola. The ordinates represent pressure and the abscissae represent volume. It will of course be evident to those skilled in the art that the perfect relationship experienced by curve A does not truly represent the conditions present in the suspension device disclosed here in that the value P does not truly represent the stiffness of the suspension device as a whole and the value V does not truly represent vertical movement of the mounting ear 110 of the wheel drive housing. In other words, even through curve A in FIG. 6 truly represents what happens to the compressible fluid above piston 42 and above the oil pool 96 to the extent that such compressible fluid acts as a perfect gas, curve A cannot be used "as is" to represent accurately the relationship of vertical displacement (abscissa) against spring stiffness (ordinate). One reason is the fact that the suspension device as a whole utilizes two pressure chambers which work in opposition to each other. Even so, curve A serves to illustrate the general principle, which is that, as piston 42 moves closer and closer to the upper limit of its travel in cylinder 48, the resistance to such movement increases asymptotically, and of course this resistance theoretically approaches infinity as the volume of the compressible fluid approaches zero. This relationship is partially offset by the pressure of a compressible fluid in the opposing chamber 66.

As a practical result, the suspension device 20 as a whole is a spring having a variable spring rate rather than a rate which varies linearly as shown by lines B and C for the vast majority of metallic springs.

The advantages in this area of a suspension device like the one herein disclosed are readily apparent in considering the characteristics of a relationship such as is indicated in curve A and compared with the straight line relationship indicated by B and C. For normal operation on a reasonably smooth road, a "soft" spring is highly desirable in order to give the operator a comfortable ride and in order to avoid shaking the equipment to destruction. A spring having such characteristics is illustrated by the straight line B and by that portion of curve A between the points X and Y. On the other hand when the wheels encounter extreme irregularities in the road, it is desirable that the spring be "stiff" near the limits of deflection in order that a small amount of displacement may encounter a high degree of resistance. This relationship is indicated by the straight line C and the portion of curve A which lies between points Q and R. It is thus evident that the combination here disclosed and claimed provides suspension means having the characteristics of a soft spring for normal operation over a comparatively smooth road, and a stiff spring for operation on a comparatively rough road.

Referring again to FIGS. 2 and 5, it will be noted that a simultaneous rise and fall of both sides of the final drive housing will effect a simple pivoting of the housing about a longitudinal linear axis through the mounting 178. More specifically, the longitudinal linear axis through mounting 178 lies in the plane of FIG. 2, so that the final drive housing pivots in a plane perpendicular to the plane of FIG. 2. However, in the rough terrain which off-highway equipment of this type must cover, such simultaneous rise and fall of both sides is unusual. The more usual situation is one in which the movement of one side is unrelated to that of the other side, resulting in considerable twisting of the final drive housing 172 on its universal joint connection 178 with the vehicle frame.

In conventional suspensions, the "springs" would be so stiff and rigid as to permit very little movement of a wheel 17 relative to the frame, resulting in a very rough ride and necessitating a corresponding slow-down of the vehicle to prevent shaking the equipment to pieces.

To some extent, the hard ride of conventional suspensions is due to the fact that the springs must be stiff enough to maintain alignment of the drive train. The suspension devices 20 do not have to maintain alignment of the final drive assembly, because that is accomplished by the roller 181R and the track 181T. In fact, to assure that no sidewise thrust is taken by the devices 20, they are secured to frame 45 and to housing 172 by ball-and-socket connections 21U and 21L respectively. Another point, however, that makes conventional suspensions rather hard riding is their weight, which, for the same amount of deflection, makes for more unsprung weight than in suspensions of the type here disclosed.

In view of the foregoing, it will be apparent that this invention provides a wheel drive and suspension system which allows for much greater deflection and, at the same time, greater rebound and shock control, than conventional suspension devices. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claim.

What is claimed is:

Drive mechanism for an automotive vehicle having a frame, a final drive housing, a universal joint securing the housing to the frame at one point, a pair of drive wheels rotatably carried by the housing in a laterally spaced relationship, a pair of laterally spaced piston-and-cylinder suspension means, each suspension means having integral rebound control means comprising a load supporting chamber charged with a compressible fluid, an opposing chamber charged with an incompressible fluid, a third chamber associated with the piston, and passage means permitting fluid flow between the second and third chambers, universal joints securing the suspension means to the frame and to the housing, and means on said housing and frame to maintain longitudinal alignment of the housing independently of the suspension means and including a roller element and a track element, one element being on said housing.

References Cited in the file of this patent
UNITED STATES PATENTS

| | | |
|---|---|---|
| 2,340,149 | Slack | Jan. 25, 1944 |
| 2,738,024 | Saives | Mar. 13, 1956 |
| 2,914,337 | Kress | Nov. 24, 1959 |